(12) United States Patent
Manzari et al.

(10) Patent No.: US 9,189,806 B2
(45) Date of Patent: Nov. 17, 2015

(54) STREAMING PLAYBACK AND DYNAMIC AD INSERTION

(71) Applicant: Disney Enterprises, Inc., Burbank, CA (US)

(72) Inventors: Giuseppe Manzari, Burbank, CA (US); Robert Longwell, Simi Valley, CA (US); Chang Liu, San Gabriel, CA (US); Andrew Bauch, West Hollywood, CA (US); David Brueck, Saratoga Springs, UT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/675,099

(22) Filed: Mar. 31, 2015

(65) Prior Publication Data

US 2015/0278884 A1    Oct. 1, 2015

Related U.S. Application Data

(63) Continuation of application No. 12/928,016, filed on Nov. 30, 2010, now Pat. No. 9,043,484.

(60) Provisional application No. 61/341,662, filed on Apr. 2, 2010.

(51) Int. Cl.
| | |
|---|---|
| *G06F 15/16* | (2006.01) |
| *G06Q 30/02* | (2012.01) |
| *H04L 29/06* | (2006.01) |
| *H04L 29/08* | (2006.01) |
| *H04N 19/127* | (2014.01) |
| *H04N 19/152* | (2014.01) |
| *H04N 19/187* | (2014.01) |
| *H04N 19/196* | (2014.01) |
| *H04N 21/81* | (2011.01) |

(52) U.S. Cl.
CPC .......... *G06Q 30/0277* (2013.01); *H04L 65/607* (2013.01); *H04L 67/02* (2013.01); *H04N 19/127* (2014.11); *H04N 19/152* (2014.11); *H04N 19/187* (2014.11); *H04N 19/196* (2014.11); *H04N 21/812* (2013.01)

(58) Field of Classification Search
None
See application file for complete search history.

(56) References Cited

U.S. PATENT DOCUMENTS

| | | | |
|---|---|---|---|
| 6,718,551 B1 * | 4/2004 | Swix et al. ................. | 725/32 |
| 2003/0149975 A1 * | 8/2003 | Eldering et al. ............ | 725/34 |
| 2008/0301317 A1 * | 12/2008 | Lee et al. ................... | 709/231 |
| 2008/0307454 A1 * | 12/2008 | Ahanger et al. ............ | 725/36 |
| 2009/0076898 A1 * | 3/2009 | Wang et al. ................ | 705/14 |

(Continued)

*Primary Examiner* — Thomas Dailey
(74) *Attorney, Agent, or Firm* — Farjami & Farjami LLP

(57) ABSTRACT

There is provided a system and method for dynamically generated client side streaming playlists. There is provided a method comprising receiving a request to stream a video asset for playback, retrieving, from a network, a video asset playlist corresponding to the video asset and an ad campaign playlist, generating a consolidated video playlist including the video asset playlist and the ad campaign playlist, and processing the consolidated video playlist using a media playback framework to stream a plurality of video files from the network for decoding and output to a display. Discontinuity tags within the video asset playlist may be utilized as insertion points for portions of the ad campaign playlist. The consolidated video playlist may be accessed through a local HTTP web server, advantageously allowing the use of commonly installed media playback framework models such as QuickTime X to trigger adaptive bitrate support through HTTP Live Streaming.

18 Claims, 3 Drawing Sheets

(56) References Cited

U.S. PATENT DOCUMENTS

2009/0094160 A1* 4/2009 Webster et al. ............... 705/51
2009/0106082 A1* 4/2009 Senti et al. .................... 705/10
2010/0088716 A1* 4/2010 Ellanti et al. .................. 725/32
2011/0138020 A1* 6/2011 Pantos et al. ................. 709/219

* cited by examiner

STREAMING PLAYBACK AND DYNAMIC AD INSERTION

RELATED APPLICATIONS

This application is a Continuation of U.S. application Ser. No. 12/928,016, filed Nov. 30, 2010, which claims priority to U.S. Provisional Application No. 61/341,662, filed on Apr. 2, 2010, which are hereby incorporated by reference in their entirety.

BACKGROUND OF THE INVENTION

1. Field of the Invention

The present invention relates generally to media playback. More particularly, the present invention relates to media playback with dynamic content insertion.

2. Background Art

Hypertext Transfer Protocol (HTTP) based streaming platforms allow content producers to continue harnessing standard web delivery technologies for streamlined implementation using existing infrastructure, avoiding the need to develop and implement new data streaming protocols. As a result, HTTP based streaming platforms are seeing widespread adoption, with player applications built for a wide range of operating systems and devices. By utilizing applications based on HTTP streaming, users can enjoy live or recorded video content streamed conveniently and easily to their favorite media consumption devices, whether it be a laptop or desktop computer, a mobile phone, a video game console, a digital video recorder, a set top box, or another network enabled media device.

In particular, Apple based platforms such as Mac OSX, iPhone OS and iPad OS have recently enabled adaptive bitrate HTTP video streaming to occur seamlessly by accessing, from a web host, a specially formatted index file in the Extended M3U (US-ASCII) or M3U8 (UTF-8) playlist format, which includes links to a plurality of M3U or M3U8 playlists having the same video content encoded in various bitrate profiles. See, for example, "HTTP Live Streaming Internet-Draft Version 2" submitted by Apple, available from http://tools.ietf.org/html/draft-pantos-http-live-streaming-02, which is hereby incorporated in its entirety. In this manner, streaming of recorded or live video content may dynamically adjust to prevailing network conditions, providing the best possible video and audio quality for an optimal user experience.

Unfortunately, since the playlist file must exist as a static file retrieved from a web host, it is difficult to provide dynamic content where the contents of the playlist may change. Moreover, the playlist file must be strictly sequential and provides no mechanisms for conditional logic. This lack of flexibility makes it difficult to provide, for example, dynamically changing advertising content, which is desired to meet the demands of advertisers and content producers. For example, advertisers may want to use demographic information and user profile information to provide targeted advertising customized for each viewer, which is not possible if media retrieval is only by a conventional static and sequential playlist.

Accordingly, there is a need to overcome the drawbacks and deficiencies in the art by providing user-friendly adaptive video streaming that can accommodate dynamic insertion of content such as advertising.

SUMMARY OF THE INVENTION

There are provided systems and methods for dynamically generated client side streaming playlists, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for dynamically generated client side streaming playlists. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
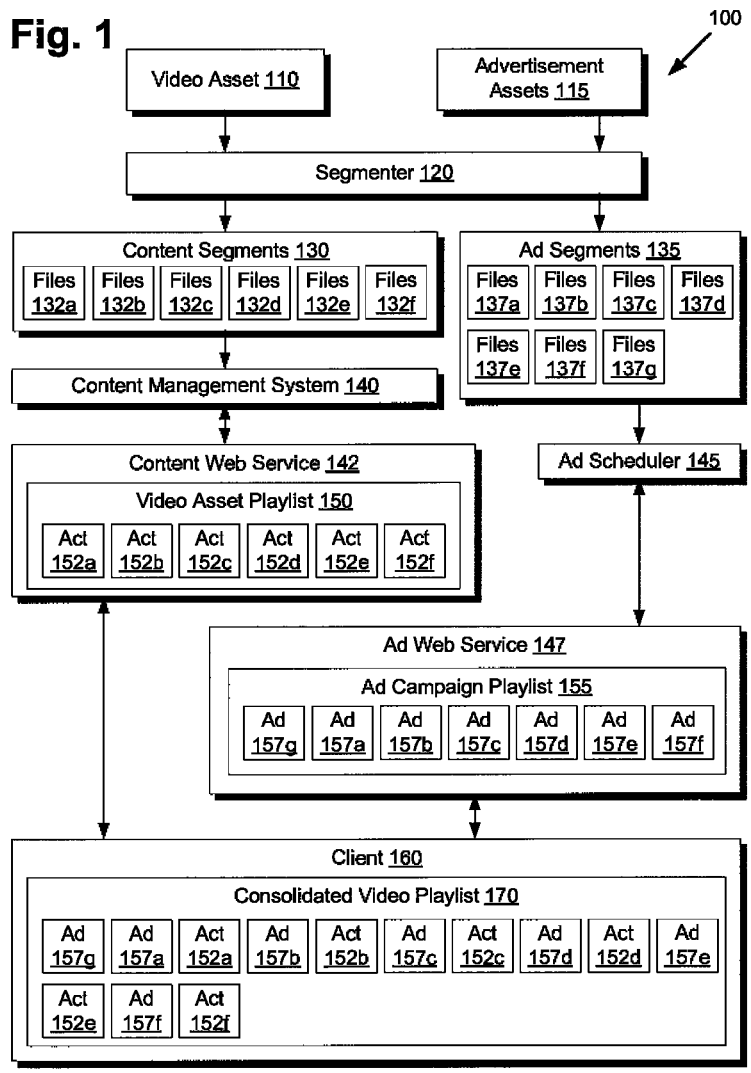
FIG. 1 presents a diagram of media content being prepared to support dynamically generated client side streaming playlists, according to one embodiment of the present invention.

FIG. 1 presents a diagram of media content being prepared to support dynamically generated client side streaming playlists, according to one embodiment of the present invention. Diagram 100 of FIG. 1 includes video asset 110, advertisement assets 115, segmenter 120, content segments 130, ad segments 135, content management system 140, ad scheduler 145, content web service 142, ad web service 147, and client 160. Content segments 130 include files 132a, 132b, 132c, 132d, 132e and 132f. Ad segments 135 include files 137a, 137b, 137c, 137d, 137e, 137f and 137g. Content web service 142 includes video asset playlist 150. Video asset playlist 150 includes act 152a, 152b, 152c, 152d, 152e and 152f. Ad web service 147 includes ad campaign playlist 155. Ad campaign playlist 155 includes ad 157g, 157a, 157b, 157c, 157d, 157e and 157f. Client 160 includes consolidated video playlist 170. Consolidated video playlist 170 includes ad 157g, ad 157a, act 152a, ad 157b, act 152b, ad 157c, act 152c, ad 157d, act 152d, ad 157e, act 152e, ad 157f and act 152f.

To support adaptive streaming, media content must first be processed into a segmented format, allowing the switching of bitrates mid-stream during playback. Thus, as shown in diagram 100 of FIG. 1, both video asset 110 and advertisement assets 115 are processed through segmenter 120 to create content segments 130 and ad segments 135, respectively. Video asset 110 may comprise recorded content programming, such as a television show, drama, news program, animation, or other creative content. For example, video asset 110 may comprise a complete episode of a television program including several intentional breaks or fade-outs intended for advertising content, and may thus comprise several distinct "acts" or segments. In the example shown in FIG. 1, video asset 110 may comprise six distinct acts. For example, if video asset 110 has a runtime of 42 minutes, then each act may comprise approximately 7 minutes of content. In alternative embodiments, video asset 110 may comprise live content, such as an event or a concert, in which case video asset 110 may be continually processed through segmenter 120 until the completion of the live content. Advertisement assets 115 may comprise a plurality of advertising spots to be shown with video asset 110.

Segmenter 120 may comprise, for example, the Apple stream segmenter, and may divide incoming media assets into suitable fixed length chunks, such as 10 seconds. These fixed length chunks may then be encoded, output, and stored as MPEG transport stream files (.ts), shown as files 132*a* through 132*f* within content segments 130 and files 137*a* through 137*g* within ad segments 135. As previously discussed, video asset 110 might comprise a television program divided into six 7-minute acts. In this case, segmenter 120 may generate files 132*a* as a collection of 42 MPEG transport stream files each having a runtime of 10 seconds. Files 132*b* through 132*f* may also have a similar composition as files 132*a*.

Additionally, although omitted from diagram 100 of FIG. 1 for simplicity, segmenter 120 may be configured to encode multiple content segments 130 and ad segments 135 in several different bitrate profiles to accommodate adaptive streaming. For example, segmenter 120 may generate four different encodes of content segments 130 and ad segments 135, with each encode processed using a different bitrate profile. For example, average bitrate profiles of 440, 640, 1140, and 1340 kbps may be utilized to provide a wide range of video qualities suitable for diverse network conditions.

Content management system 140 may then index files 132*a* through 132*f* for servicing by content web service 142. Content web service 142 is thereby enabled to generate playlists, such as video asset playlist 150, referencing media files indexed and managed by content management system 140. Video asset playlist 150 comprises a sequential list of playlists, or acts 152*a* through 152*f* referencing files 132*a* through 132*f* respectively. Video asset playlist 150 may, for example, utilize the Extended M3U8 playlist format defined by Apple. The following is an example 70-second video asset playlist 150 encoded in a 440 Kbps encoding profile, divided into three shortened acts for simplicity (30 seconds, 20 seconds and 20 seconds):

EXTM3 U
EXT-X-TARGETDURATION:10
EXT-X-MEDIA-SEQUENCE:0
EXTINF:10,
EXT-X-KEY:METHOD=AES-
128,URI=http://ll.media.abc.com/temp/Lost607Test5/
Lost607-1__440/crypt.key
http://ll.media.abc.com/temp/Lost607Test5/Lost607-1__
440/fileSequence0.ts
EXTINF: 10,
http://ll.media.abc.com/temp/Lost607Test5/Lost607-1__
440/fileSequence1.ts
EXTINF: 10,
http://ll.media.abc.com/temp/Lost607Test5/Lost607-1__
440/fileSequence2.ts
EXT-X-DISCONTINUITY
EXT-X-MEDIA-SEQUENCE: 0
EXTINF: 10,
EXT-X-KEY:METHOD=AES-
128,URI="http://ll.media.abc.com/temp/Lost607Test5/
Lost607-2__440/crypt.key"
http://ll.media.abc.com/temp/Lost607Test5/Lost607-2__
440/fileSequence0.ts
EXTINF: 10,
http://ll.media.abc.com/temp/Lost607Test5/Lost607-2__
440/fileSequence1.ts
EXT-X-DISCONTINUITY
EXT-X-MEDIA-SEQUENCE:0
EXTINF: 10,
EXT-X-KEY:METHOD=AES-
128,URI="http://ll.media.abc.com/temp/Lost607Test5/
Lost607-3__440/crypt.key"
http://ll.media.abc.conthemp/Lost607Test5/Lost607-3__
440/fileSequence0.ts
EXTINF:10,
http://ll.media.abc.com/temp/Lost607Test5/Lost607-3__
440/fileSequence1.ts
EXT-X-ENDLIST Note the presence of the Discontinuity Tags (#EXT-X-DISCONTINUITY) indicating breaks between acts and providing convenient insertion points for referencing dynamic content such as advertising. A fully composed video asset playlist 150 may appear similar in structure to the example above, but with six 7-minute acts each including 42 sequentially listed 10-second MPEG transport stream files, with discontinuity tags inserted between act transitions. Additionally, if multiple bitrate encodes of files 132*a* through 132*f* are available, then video asset playlist 150 may instead comprise a master playlist referencing nested playlists of content encoded at different birates, wherein each nested playlist is structured similarly to video asset playlist 150.

Advertisement assets 115 may include a plurality of advertising spots, for example 7 distinct advertising spots each having a 30 second length. Similar to video asset 110, each advertising spot may be divided into smaller fixed length chunks using segmenter 120. Ad scheduler 145 may then index files 137*a* through 137*g* for servicing by ad web service 147. Ad web service 147 is thereby enabled to generate advertising campaign playlists, such as ad campaign playlist 155, referencing media files indexed and managed by ad scheduler 145. Ad campaign playlist 155 comprises a sequential list of playlists, or ad 157*a* through 157*g* referencing files 137*a* through 137*g* respectively. Ad campaign playlist 155 may also be targeted for the intended user, or the user of client 160. For example, user profile data, geographic location, browser cookies, history, device data, the subject matter of video asset playlist 150, and other data associated with client 160 may be analyzed to generate ad campaign playlist 155 having advertisements more likely to coincide with the interests of the user of client 160.

As previously described, segmenter 120 may generate multiple bitrate encodes of ad segments 135 for adaptive streaming support. In this case, assuming a 30 second runtime, ad 157*a* may comprise a master playlist similar to the following:

EXTM3 U
EXT-X-STREAM-INF:PROGRAM-ID=1, BANDWIDTH=440000
http://ll.media.abc.com/ads/Target/Target__440.m3u8
EXT-X-STREAM-INF:PROGRAM-ID=1, BANDWIDTH=640000
http://ll.media.abc.com/ads/Target/Target__640.m3u8
EXT-X-STREAM-INF:PROGRAM-ID=1, BANDWIDTH=1140000
http://ll.media.abc.com/ads/Target/Target__1140.m3u8

```
#EXT-X-STREAM-INF:PROGRAM-ID=1, BAND-
    WIDTH=1340000
http://ll.media.abc.com/ads/Target/Target_1340.m3u8
```
wherein "Target_440.m3u8" may comprise a nested playlist similar to the following:
```
#EXTM3 U
EXT-X-TARGETDURATION:10
EXT-X-MEDIA-SEQUENCE:0
EXTINF:10,
http://ll.media.abc.com/ads/Target/Target_440/
    fileSequence0.ts
#EXTINF:10,
http://ll.media.abc.com/ads/Target/Target_440/
    fileSequence1.ts
#EXTINF:10,
http://ll.media.abc.com/ads/Target/Target_440/
    fileSequence2.ts
#EXT-X-ENDLIST
```
"Target_640.m3u8", "Target_1140.m3u8", and "Target_1340.m3u8" may also comprise nested playlists similar to "Target_440.m3u8" listed above, with each playlist referencing MPEG transport stream files encoded at the specified bitrate ("BANDWIDTH"). Ad 157b through 157g referencing other ad spots may also be structured similarly to ad 157a.

After video asset playlist 150 and ad campaign playlist 155 are sent to client 160, client 160 may then generate and playback consolidated video playlist 170, comprising an ordered list of playlists as shown in FIG. 1. An example consolidated asset playlist 170 may appear similar to the following, for the 440 kbps bitrate profile:
```
#EXTM3 U
#EXT-X-TARGETDURATION: 10
#EXT-X-MEDIA-SEQUENCE:0
EXTINF:10,
EXT-X-KEY:METHOD=AES-
    128,URI=http://ll.media.abc.com/temp/Lost607Test5/
    Lost607-1_440/crypt.key
http://ll.media.abc.com/temp/Lost607Test5/Lost607-1_
    440/fileSequence0.ts
EXTINF:10,
http://ll.media.abc.com/temp/Lost607Test5/Lost607-1_
    440/fileSequence1.ts
#EXTINF:10,
http://ll.media.abc.com/temp/Lost607Test5/Lost607-1_
    440/fileSequence2.ts
EXT-X-DISCONTINUITY
EXT-X-MEDIA-SEQUENCE:0
EXTINF:10,
http://ll.media.abc.com/ads/Target/Target_440/
    fileSequence0.ts
#EXTINF:10,
http://ll.media.abc.com/ads/Target/Target_440/
    fileSequence1.ts
#EXTINF:10,
http://ll.media.abc.com/ads/Target/Target_440/
    fileSequence2.ts
#EXT-X-DISCONTINUITY
EXT-X-MEDIA-SEQUENCE:0
EXTINF:10,
EXT-X-KEY:METHOD=AES-
    128,URI="http://ll.media.abc.com/temp/Lost607Test5/
    Lost607-2_440/crypt.key"
http://ll.media.abc.com/temp/Lost607Test5/Lost607-2_
    440/fileSequence0.ts
EXTINF:10,
http://ll.media.abc.com/temp/Lost607Test5/Lost607-2_
    440/fileSequence1.ts
EXT-X-DISCONTINUITY
EXT-X-MEDIA-SEQUENCE:0
EXTINF:10,
http://ll.media.abc.com/ads/Target/Target_440/
    fileSequence0.ts
#EXTINF:10,
http://ll.media.abc.com/ads/Target/Target_440/
    fileSequence1.ts
#EXTINF:10,
http://ll.media.abc.com/ads/Target/Target_440/
    fileSequence2.ts
#EXT-X-DISCONTINUITY
EXT-X-MEDIA-SEQUENCE:0
EXTINF:10,
EXT-X-KEY:METHOD=AES-
    128,URI="http://ll.media.abc.com/temp/Lost607Test5/
    Lost607-3_440/crypt.key"
http://ll.media.abc.com/temp/Lost607Test5/Lost607-3_
    440/fileSequence0.ts
EXTINF:10,
http://ll.media.abc.com/temp/Lost607Test5/Lost607-3_
    440/fileSequence1.ts
EXT-X-ENDLIST
```
The above example consolidated playlist utilizes the previous example 70-second video asset playlist 150 at 440 Kbps with the same ad 157a or "Target_440.m3u8" inserted between acts. Thus, a 30-second first act is followed by a 30-second advertisement, followed by a 20-second second act, followed by a 30-second advertisement, and finally finished with a 20-second third act. As shown above, the discontinuity tags indicate the positions where the advertisement content is to be inserted, and additional discontinuity tags are further inserted after each advertisement finishes. A fully composed consolidated video playlist 170 may appear similar in structure to the example above, but with six 7-minute acts each including 42 sequentially listed 10-second MPEG transport stream files and seven 30-second advertisements each including 3 sequentially listed 10-second MPEG transport stream files. As shown in consolidated video playlist 170 of FIG. 1, multiple ads may be played as a pre-roll before the actual video content begins. Additionally, although each act is separated by a single advertisement, in alternative embodiments, multiple advertisements could be played between acts.

For simplicity, diagram 100 of FIG. 1 only illustrates a limited number of elements. However, in alternative embodiments, certain elements shown in diagram 100 may be increased in number, and additional elements may be added. For example, video asset 110 may instead comprise several video assets to provide a wide selection of programming for users. Content web service 142 and ad web service 147 may generate multiple playlists to service multiple requests. Client 160 may instead comprise several clients to support multiple users concurrently. Multiple instances of content web service 142, ad web service 147, content management system 140, and ad scheduler 145 may be utilized for load balancing across multiple servers and to support large numbers of concurrent users. Ad web service 147 may have access to various user databases, not shown in FIG. 1, to provide highly targeted marketing campaigns.

Figure 2:
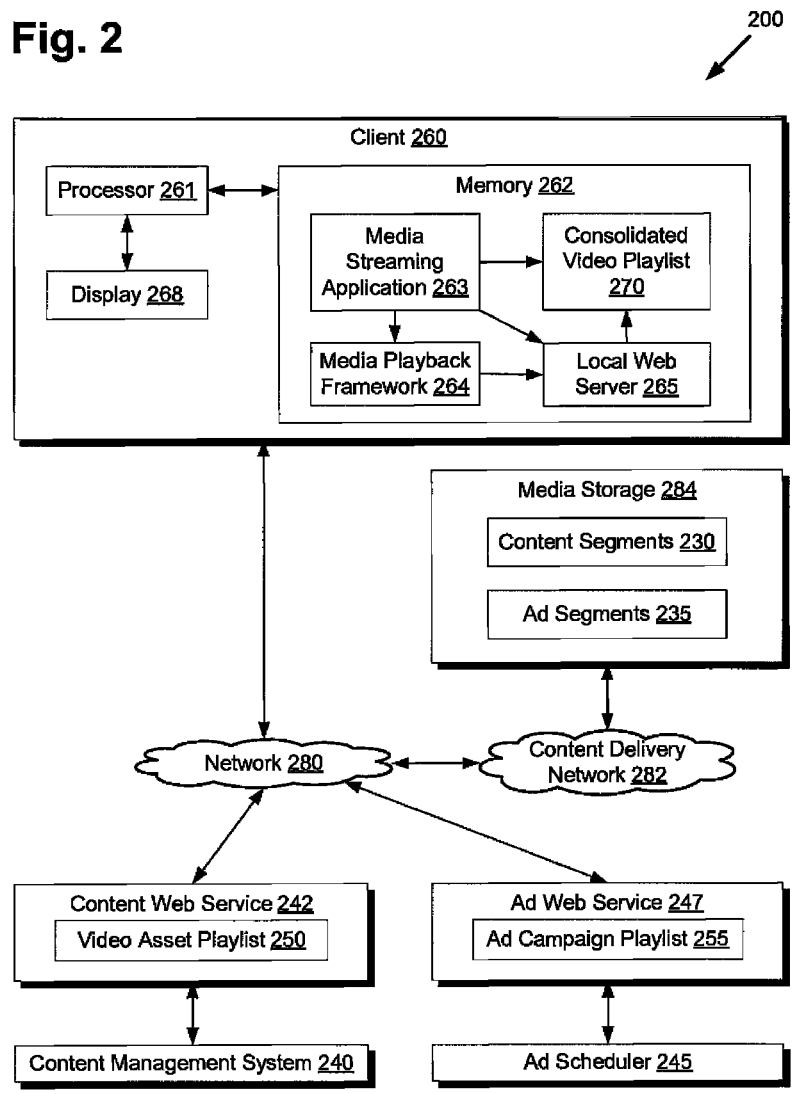
FIG. 2 presents a system diagram for serving media content through dynamically generated client side streaming playlists, according to one embodiment of the present invention.

Moving to FIG. 2, FIG. 2 presents a system diagram for serving media content through dynamically generated client side streaming playlists, according to one embodiment of the present invention. Diagram 200 of FIG. 2 includes client 260, media storage 284, network 280, content delivery network 282, content web service 242, ad web service 247, content management system 240, and ad scheduler 245. Client 260 includes processor 261, display 268, and memory 262.

Memory 262 includes media streaming application 263, media playback framework 264, local web server 265, and consolidated video playlist 270. Media storage 284 includes content segments 230 and ad segments 235. Content web service 242 includes video assets 250. Ad web service 247 includes ad campaign 255. With respect to FIG. 2, client 260 corresponds to client 160 from FIG. 1, content segments 230 corresponds to content segments 130 from FIG. 1, ad segments 235 corresponds to ad segments 135 from FIG. 1, content web service 242 corresponds to content web service 142 from FIG. 1, ad web service 247 corresponds to ad web service 147 from FIG. 1, content management system 240 corresponds to content management system 140 from FIG. 1, and ad scheduler 245 corresponds to ad scheduler 145 from FIG. 1.

Client 260 may comprise any network capable media player. For example, client 260 may comprise a desktop or laptop computer running. Mac OSX, a mobile phone running iPhone OS (iOS) or a tablet computer running iPad OS. Processor 261 of client 260 may execute media streaming application 263 within memory 262. For example, media streaming application 263 may be downloaded and installed from a centralized application repository, such as the Apple App Store. The user of client 260 may then use an input device, such as a touch sensitive screen embedded in display 268, to browse and select a desired media content for streaming. Media streaming application 263 may then access network 280, which may comprise a public network such as the Internet, to retrieve video asset playlist 250, corresponding to the desired media content, from content web service 242. Additionally, media streaming application 263 may submit identification data, such as a user ID associated with client 260, to ad web service 247 so that a targeted ad campaign playlist 255 can be retrieved.

Once media streaming application 263 has retrieved video asset playback 250 and ad campaign playlist 255, a consolidated video playlist 270 may be generated by utilizing the discontinuity tags present in video asset playlist 250 as insertion points for advertising spots contained in ad campaign playlist 255, similar to the process described for consolidated video playlist 170 in FIG. 1. To initiate playback of consolidated video playlist 270, media streaming application 263 may rely on media playback framework 264, which may comprise part of the pre-installed functionality of client 260. For example, media playback framework 264 may comprise the QuickTime X playback framework for Apple devices.

Conventionally, media playback framework 264 may require that a playlist be accessed through the web, or by HTTP, to initiate streaming functionality. For example, accessing a locally stored playlist file directly by local file system references may result in a download attempt or showing an error message rather than the intended action of streaming. Thus, media streaming application 263 may also initiate the execution of local web server 265 on processor 261, which may allow client 260 to act as a web server. Local web server 265 may be configured to only accept connections locally, or from client 260, and may expose consolidated video playlist 270 for access through HTTP. As a result, since media playback framework 264 can access consolidated video playlist 270 through HTTP, adaptive bitrate video streaming, such as HTTP Live Streaming, may be automatically initiated. Thus, media streaming application 263 executing on the client side can dynamically generate the streaming playlist, or consolidated video playlist 270, for adaptive streaming playback, advantageously using existing media frameworks already available on client 260.

To prevent ad skipping when a user performs a seek through consolidated video playlist 270, media streaming application 263 may, for example, enforce the full viewing of at least the most recent advertising spot by first seeking to the beginning of the nearest advertising playlist within consolidated video playlist 270 and disabling fast forward or seek controls. Playback may then resume from the beginning of the video content or to the requested user seek position.

Consolidated video playlist 270 may reference files hosted on content delivery network 282, which may redirect incoming requests to the most appropriate server within content delivery network 282, for example by geographic proximity, connection speed, or free capacity. Each server may include a local duplicated copy of media storage 284, which includes the actual video media files, or content segments 230 and ad segments 235. Content delivery network 282 may then stream the actual media content from media storage 284 over network 280 for decoding and output to display 268 of client 260.

Figure 3:
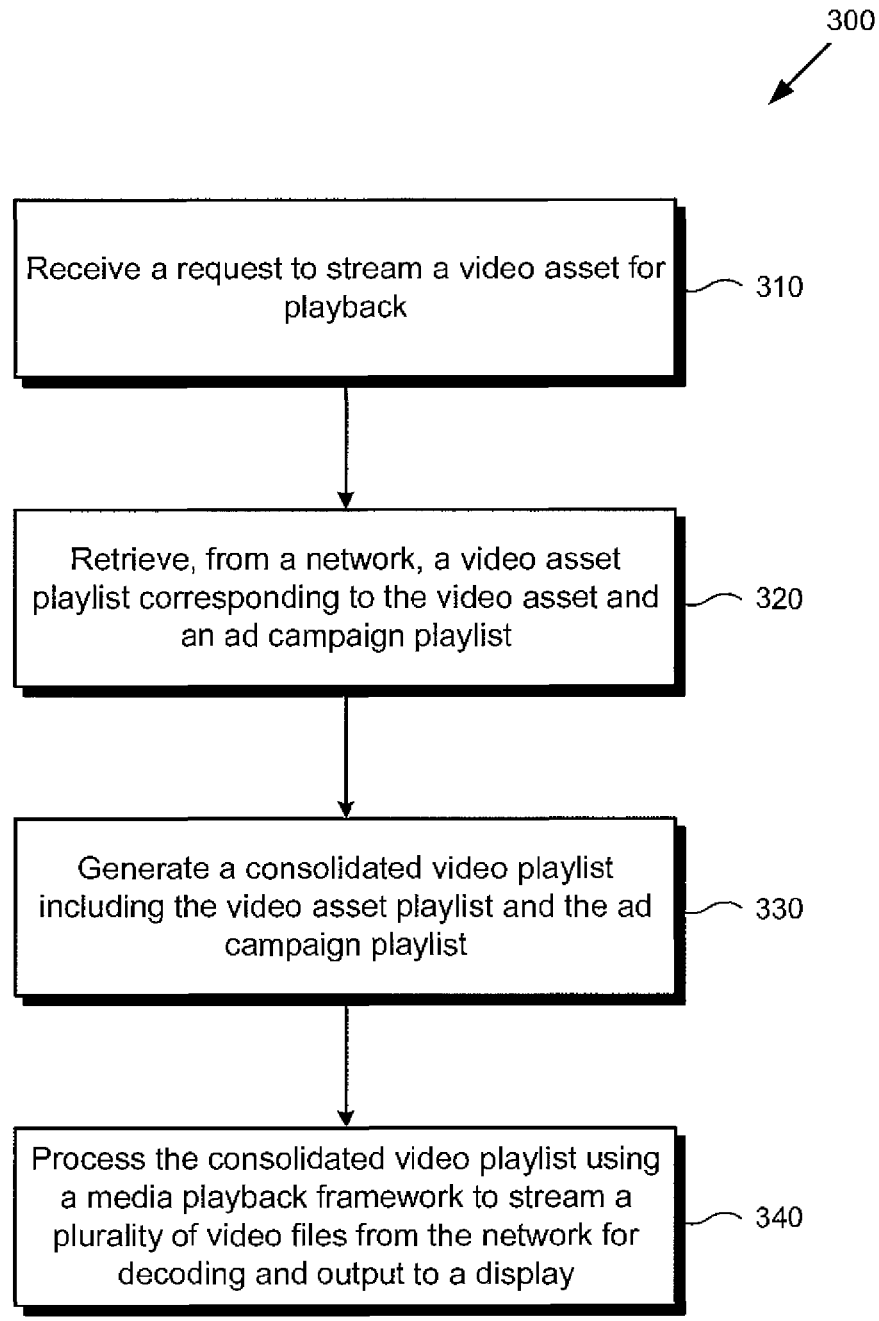
FIG. 3 shows a flowchart describing the steps, according to one embodiment of the present invention, by which dynamically generated client side streaming playlists may be provided for streaming media content.

Moving to FIG. 3, FIG. 3 shows a flowchart describing the steps, according to one embodiment of the present invention, by which dynamically generated client side streaming playlists may be provided for streaming media content. Certain details and features have been left out of flowchart 300 that are apparent to a person of ordinary skill in the art. For example, a step may comprise one or more substeps or may involve specialized equipment or materials, as known in the art. While steps 310 through 340 indicated in flowchart 300 are sufficient to describe one embodiment of the present invention, other embodiments of the invention may utilize steps different from those shown in flowchart 300.

Referring to step 310 of flowchart 300 in FIG. 3 and diagram 200 of FIG. 2, step 310 of flowchart 300 comprises processor 261 of client 260 receiving a request to stream a video asset for playback. For example, if display 268 comprises a touch sensitive display, then media streaming application 263 executing on client 260 may provide a user interface on display 268 allowing a user to request by touch input a particular desired video media for streaming. Referring to FIG. 1, the desired media may correspond to video asset 110, which is pre-processed as shown in FIG. 1. Correspondingly, content segments 230 within media storage 284 in FIG. 2 may contain the video asset requested in step 310.

Referring to step 320 of flowchart 300 in FIG. 3 and diagram 200 of FIG. 2, step 320 of flowchart 300 comprises processor 261 of client 260 retrieving, from network 280, video asset playlist 250 corresponding to content segments 230 requested from step 310 and ad campaign playlist 255. Ad campaign playlist 255 may also correspond to ad segments 235. Thus, media streaming application 263 may communicate with content web service 242 and ad web service 247 respectively to retrieve video asset playlist 250 and ad campaign playlist 255. As previously described, ad web service 247 may target ad campaign playlist 255 depending on user, history, and other data available for client 260.

Moreover, to support adaptive bitrate streaming, video asset playlist 250 and ad campaign playlist 255 may be provided using multiple encoding profiles and referencing chunked files having a specific maximum runtime, such as 10 seconds or less. This allows media playback framework 264 to change to a different encoding profile midstream in response to a status of network 280 by simply switching to a different playlist after decoding of the present file chunk finishes. Thus, in one embodiment, playback framework 264 may utilize the HTTP Live Streaming specification as one particular implementation for adaptive bitrate streaming support.

Referring to step 330 of flowchart 300 in FIG. 3 and diagram 200 of FIG. 2, step 330 of flowchart 300 comprises processor 261 of client 260 generating consolidated video playlist 270 including video asset playlist 250 and ad campaign playlist 255 retrieved from step 320. The process of generating consolidated video playlist 270 may be similar to the process described for consolidated video playlist 170 in FIG. 1. More particularly, if video asset playlist 250 and ad campaign playlist 255 are specified in the Extended M3U or M3U8 playlist format, then discontinuity tags within video asset playlist 250 may be utilized to insert portions of ad campaign playlist 255, thereby dynamically inserting advertising content. If standard M3U or M3U8 formats are utilized, then insertion points might be conveyed in a separate file or through embedded metadata.

Referring to step 340 of flowchart 300 in FIG. 3 and diagram 200 of FIG. 2, step 340 of flowchart 300 comprises processor 261 of client 260 processing consolidated video playlist 270 generated from step 330 using media playback framework 264 to stream content segments 230 and ad segments 235 from network 280 for decoding and output to display 268. For example, if media playback framework 264 comprises QuickTime X, then local web server 265 may provide local access to consolidated video playlist 270 through HTTP, thereby successfully triggering HTTP Live Streaming. Furthermore, consolidated video playlist 270 may reference files hosted on a content delivery network (CDN) such as content delivery network 282, which can enable optimized access to media storage 264.

In the above manner, dynamically generated client side streaming playlists with changing advertising content are thus supported. Since the consolidated asset playlists may be flexibly generated for dynamic ad insertion by a client side streaming media application and served using a localhost HTTP web server for adaptive bitrate support, the limitations of static playlist files are overcome while advantageously avoiding any required changes to commonly installed media playback framework models such as QuickTime X or another framework that is QuickTime X compatible.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A device comprising:
a processor configured to:
receive a request to stream a video asset for playback;
retrieve, from a network, a first video asset playlist including a plurality of segments of the video asset encoded at a first encoding rate and a second video asset playlist including the plurality of segments of the video asset encoded at a second encoding rate, wherein the first encoding rate is different than the second encoding rate;
retrieve, from the network, a first ad campaign playlist including a plurality of segments of an ad campaign encoded at the first encoding rate and a second ad campaign playlist including the plurality of segments of the ad campaign encoded at the second encoding rate;
consolidate the first video asset playlist including the plurality of segments of the video asset with the first ad campaign playlist including the plurality of segments of the ad campaign to generate a first consolidated playlist having a plurality of segments at the first encoding rate;
consolidate the second video asset playlist including the plurality of segments of the video asset with the second ad campaign playlist including the plurality of segments of the ad campaign to generate second first consolidated playlist having a plurality of segments at the second encoding rate; and
adaptively switch, based on a status of the network, between streaming the first consolidated playlist at the first encoding rate and the second consolidated playlist at the second encoding rate.

2. The device of claim 1, wherein each of the plurality of segments of the video asset has a runtime of 10 seconds or less.

3. The device of claim 1, wherein the processor is configured to generate the first consolidated playlist by executing a local web server to provide the media playback framework access to the first consolidated playlist by Hypertext Transfer Protocol (HTTP).

4. The device of claim 1, wherein the first video asset playlist, the second video asset playlist, the first ad campaign playlist, the second ad campaign playlist, the first consolidated playlist and the second consolidated playlist are each specified in the M3U or M3U8 playlist format.

5. The device of claim 1, wherein the first video asset playlist, the second video asset playlist, the first ad campaign playlist, the second ad campaign playlist, the first consolidated playlist and the second consolidated playlist are each specified in the Extended M3U or Extended M3U8 playlist format, and wherein the processor is configured to generate the first consolidated playlist by using a plurality of discontinuity tags within the first consolidated playlist to insert portions of the first ad campaign playlist.

6. The device of claim 1, wherein the media playback framework utilizes HTTP Live Streaming.

7. The device of claim 1, wherein the first ad campaign playlist and the second ad campaign playlist are targeted for the device.

8. The device of claim 1, wherein the plurality of segments of the video asset are hosted on a content delivery network (CDN).

9. The device of claim 1, wherein the first video asset playlist and the second video asset playlist are retrieved from a content web server and the first ad campaign playlist and the second ad campaign playlist are retrieved from an ad web server.

10. A method for use by a device having a processor, the method comprising:
receiving, using the processor, a request to stream a video asset for playback;
retrieving, using the processor, from a network, a first video asset playlist including a plurality of segments of the video asset encoded at a first encoding rate and a second video asset playlist including the plurality of segments of the video asset encoded at a second encoding rate, wherein the first encoding rate is different than the second encoding rate;
retrieving, using the processor, from the network, a first ad campaign playlist including a plurality of segments of an ad campaign encoded at the first encoding rate and a second ad campaign playlist including the plurality of segments of the ad campaign encoded at the second encoding rate;

consolidating, using the processor, the first video asset playlist including the plurality of segments of the video asset with the first ad campaign playlist including the plurality of segments of the ad campaign to generate a first consolidated playlist having a plurality of segments at the first encoding rate;

consolidating, using the processor, the second video asset playlist including the plurality of segments of the video asset with the second ad campaign playlist including the plurality of segments of the ad campaign to generate second first consolidated playlist having a plurality of segments at the second encoding rate; and adaptively switching, using the processor, based on a status of the network, between streaming the first consolidated playlist at the first encoding rate and the second consolidated playlist at the second encoding rate.

11. The method of claim 10, wherein each of the plurality of segments of the video asset has a runtime of 10 seconds or less.

12. The method of claim 10, wherein the processor generates the first consolidated playlist by executing a local web server to provide the media playback framework access to the first consolidated playlist by Hypertext Transfer Protocol (HTTP).

13. The method of claim 10, wherein the first video asset playlist, the second video asset playlist, the first ad campaign playlist, the second ad campaign playlist, the first consolidated playlist and the second consolidated playlist are each specified in the M3U or M3U8 playlist format.

14. The method of claim 10, wherein the first video asset playlist, the second video asset playlist, the first ad campaign playlist, the second ad campaign playlist, the first consolidated playlist and the second consolidated playlist are each specified in the Extended M3U or Extended M3U8 playlist format, and wherein the processor generates the first consolidated playlist by using a plurality of discontinuity tags within the first consolidated playlist to insert portions of the first ad campaign playlist.

15. The method of claim 10, wherein the media playback framework utilizes HTTP Live Streaming.

16. The method of claim 10, wherein the first ad campaign playlist and the second ad campaign playlist are targeted for the device.

17. The method of claim 10, wherein the plurality of segments of the video asset are hosted on a content delivery network (CDN).

18. The method of claim 10, wherein the first video asset playlist and the second video asset playlist are retrieved from a content web server and the first ad campaign playlist and the second ad campaign playlist are retrieved from an ad web server.

* * * * *